United States Patent
Subramanian et al.

(10) Patent No.: US 12,513,207 B2
(45) Date of Patent: Dec. 30, 2025

(54) SYSTEM AND METHOD FOR COORDINATED RESOURCE SCALING IN MICROSERVICE-BASED AND SERVERLESS APPLICATIONS

(71) Applicant: INTERNATIONAL BUSINESS MACHINES CORPORATION, Armonk, NY (US)

(72) Inventors: Chitra Subramanian, Mahopac, NY (US); Pavithra Harsha, Pleasantville, NY (US); Shivaram Subramanian, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/668,099

(22) Filed: May 17, 2024

(65) Prior Publication Data

US 2025/0358331 A1  Nov. 20, 2025

(51) Int. Cl.
  *G06F 15/16*   (2006.01)
  *H04L 67/1008*  (2022.01)
  *H04L 67/1012*  (2022.01)

(52) U.S. Cl.
  CPC ...... *H04L 67/1008* (2013.01); *H04L 67/1012* (2013.01)

(58) Field of Classification Search
  CPC .................. H04L 67/1008; H04L 67/1012
  USPC .......................................... 709/203
  See application file for complete search history.

(56) References Cited

U.S. PATENT DOCUMENTS

| | | | |
|---|---|---|---|
| 11,966,788 B2 | 4/2024 | Macdonald | |
| 2010/0299437 A1* | 11/2010 | Moore | H04L 67/1001 709/224 |
| 2018/0337980 A1* | 11/2018 | Schreter | H04L 67/1012 |
| 2019/0342379 A1* | 11/2019 | Shukla | G06F 9/5077 |

(Continued)

FOREIGN PATENT DOCUMENTS

| | | |
|---|---|---|
| CN | 115858318 A | 3/2023 |
| CN | 115913967 A | 4/2023 |
| WO | 202348609 A1 | 3/2023 |

OTHER PUBLICATIONS

Barnhart, C. et al., "Branch-and-Price: Column Generation for Solving Huge Integer Programs", Operations Research (1970), 34 pgs.

(Continued)

*Primary Examiner* — Alicia Baturay
(74) *Attorney, Agent, or Firm* — CHIP LAW GROUP

(57) ABSTRACT

A computer-implemented method for trace-driven call-graph-aware proactive coordinated autoscaling of component microservices in an application includes generating performance-resource elasticity models of endpoints of the component microservices of the application. Workload levels of the endpoint of the component microservices is predicted based on user traffic observed at a front end service. A trace-level performance of the application is predicted for different microservice replica scaling based on the performance-resource elasticity models at end points, the ends points on the trace call graph and the predicted workload levels. A microservice replica scaling is recommended for each of the component microservices to meet predefined trace-level user service level objectives.

20 Claims, 11 Drawing Sheets

(56) References Cited

U.S. PATENT DOCUMENTS

| | | | | |
|---|---|---|---|---|
| 2020/0389517 | A1* | 12/2020 | Eloy | G06F 9/505 |
| 2022/0046083 | A1* | 2/2022 | Nair | H04N 21/4334 |
| 2022/0353201 | A1* | 11/2022 | Navali | H04L 41/5054 |
| 2023/0308398 | A1* | 9/2023 | Vedam | H04L 47/83 |
| 2025/0013504 | A1* | 1/2025 | Misur | G06F 9/5077 |

OTHER PUBLICATIONS

Irnich, S. et al., "Shortest Path Problems with Resource Constraints", In Column generation, Springer, 2004, 31 pgs.

Wang, Z. et al., "DeepScaling: Microservices Autoscaling for Stable CPU Utilization in Large Scale Cloud Systems", In Proceedings of the 13th Symposium on Cloud Computing, SoCC '22, p. 16-30, New York, NY, USA, 2022. Association for Computing Machinery, 18 pgs.

Zhang, Y. et al., "Analytically-Driven Resource Management for Cloud-Native Microservices", IEEE (2024), 16 pgs.

Barnhart, C. et al., "Branch-and-Price: Column Generation for Solving Huge Integer Programs", INFORMS (2014) 15, pgs.

Subramanian, S. et al., "Constrained Prescriptive Trees via Column Generation", arXiv:2207.10163v1 (2022), 22 pgs.

Authors (Disclosed without attribution), "Multi-Dimensional Pod Autoscaling with Reinforcement Learning," IPCOM000272749D, IP.com, Jul. 31, 2023, 6 pages.

Authors (Disclosed without attribution), "Setting and Aligning Service Level Objectives (SLOs) in Distributed Applications," IPCOM000270080D, IP.com, Jun. 1, 2022, 6 pages.

Abdullah, Muhammad, et al., "Learning Predictive Autoscaling Policies for Cloud-Hosted Microservices Using Trace-Driven Modeling," 2019 IEEE International Conference on Cloud Computing Technology and Science (CloudCom), IEEE, 2019, 8 pages.

Vu, Dinh-Dai, et al., "Predictive Hybrid Autoscaling for Containerized Applications," IEEE Access 10 (2022): 109768-109778.

List of IBM Patents or Patent Applications Treated as Related (2024) 2 pgs.

International Searching Authority, "Notification of Transmittal of the International Search Report and the Written Opinion of the International Searching Authority, or Declaration," Patent Cooperation Treaty Sep. 18, 2025, 11 pages, International Application No. PCT/EP2025/061678.

Park et al., "A Graph Neural Network based Proactive Resource Allocation Framework for SLO-Oriented Microservices", CoNEXT '21: Proceedings of the 17th International Conference on emerging Networking Experiments and Technologies, Dec. 2, 2021, pp. 154-167.

* cited by examiner

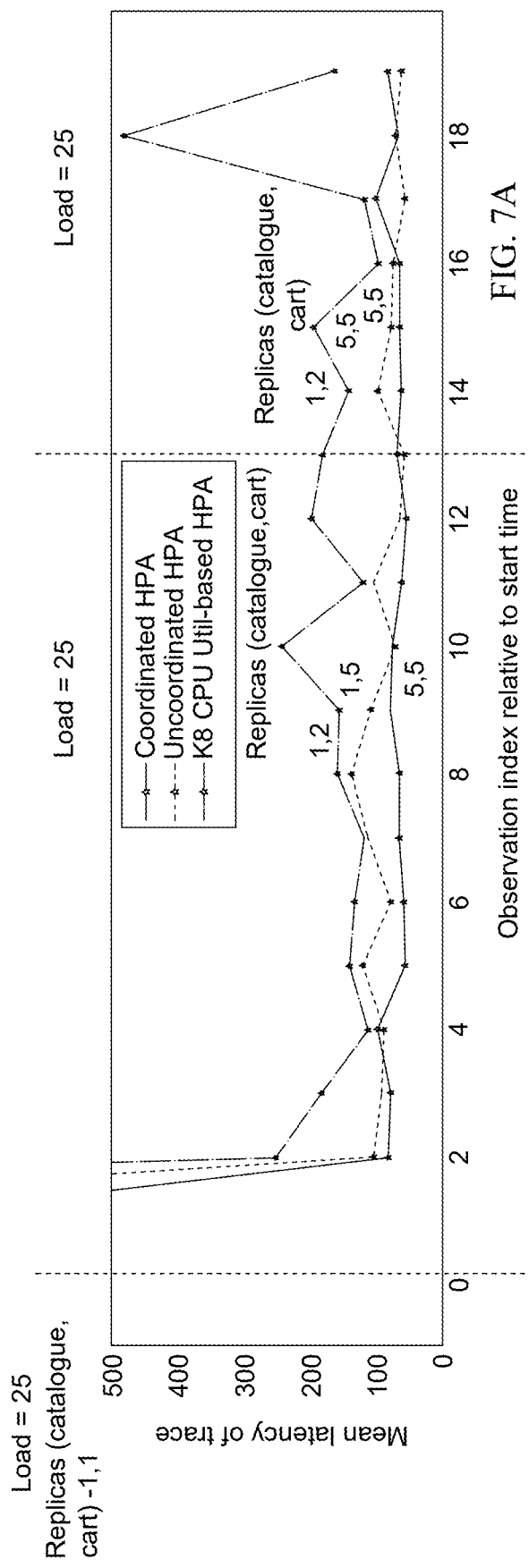
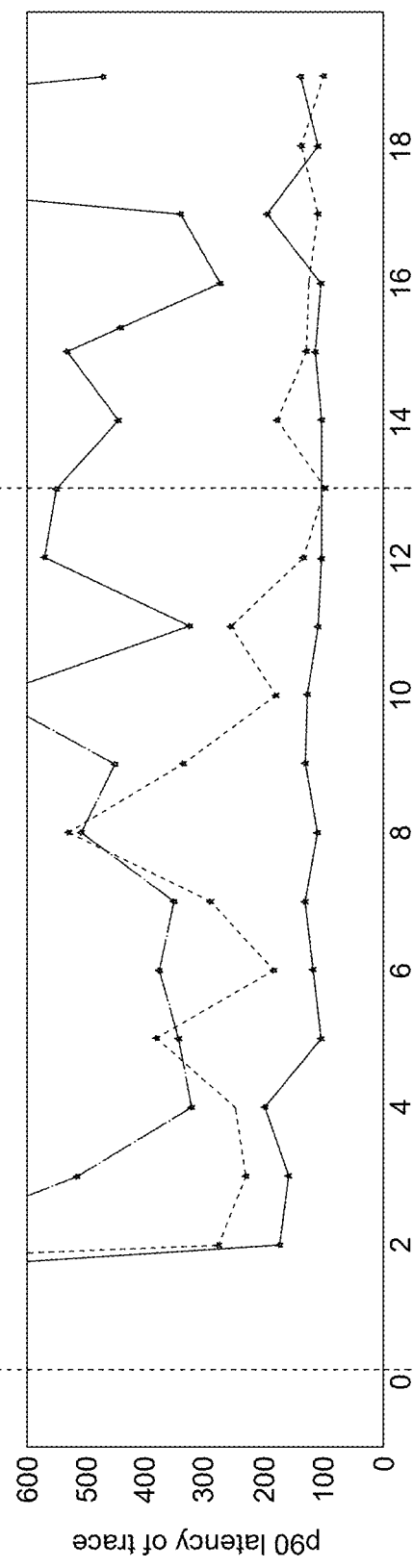
FIG. 7A
FIG. 7B

SYSTEM AND METHOD FOR COORDINATED RESOURCE SCALING IN MICROSERVICE-BASED AND SERVERLESS APPLICATIONS

BACKGROUND

The present disclosure generally relates to systems and methods for managing resources for microservice-based and serverless (Function-as-a-Service) applications, and more particularly, to a trace-driven, call-graph-aware horizontal pod autoscaling for resource management.

Microservices-based applications involve scaling of resources belonging to each component microservice; however, users experience the application performance at the aggregated "trace" level, that is the end-to-end user transaction level, for the front end application.

Autoscaling relates to the problem of the dynamic right-sizing of compute resources to support user workload. Autoscaling in microservices-based applications attempt to determine the most efficient scale of resources belonging to each component microservice to meet the service level objectives (SLOs) set by users for end-to-end transactions or traces.

Current autoscaling methods in practice (i) involve users to set SLOs at the microservice level, and (ii) perform resource scaling of individual microservices.

SUMMARY

A system, method and computer program code are described that provide a computer-implemented method for trace-driven call-graph-aware proactive coordinated autoscaling of component microservices in an application that includes generating performance-resource elasticity models of an endpoint of the component microservices of the application. Workload levels of the endpoint of the component microservices is predicted based on user traffic observed at a front end service. A trace-level performance of the application is predicted for different microservice replica scaling based on the performance-resource elasticity models at end-points, the end-points on the trace obtained from its call-graph and the predicted workload levels. A microservice replica scaling is recommended for each of the component microservices to meet one or more predefined trace-level user service level objectives.

In some embodiments, the recommended microservice replica scaling is based on a microservice endpoint self-latency aggregation.

In some embodiments, the microservice endpoint self-latency is defined as an isolated latency contribution of a given endpoint of a given component microservice to an overall trace latency for each component microservice used in the application and can be obtained directly from Application performance monitoring (APM) tools or estimated via disaggregation of cumulative latencies at end points on trace leveraging the call-graph.

In some embodiments, the trace-level service level objectives include at least one of latency or throughput targets.

In some embodiments, the performance-resource elasticity models predict self-latency performance at each of the endpoints a given component microservice as a function of a vector of workload levels to all endpoints that belong to the given microservice.

In some embodiments, the predicted trace-level performance is based on an aggregated self-latency of the component microservices identified in the call graph.

In some embodiments, the method further includes using a machine learning model for generating the performance-resource elasticity models.

In some embodiments, the predicted workload levels are based on a predicted load, a currently observed load, or a combination thereof.

In some embodiments, the method further includes predicting workload levels at each endpoints of the component microservice used in the application.

In some embodiments, the method further includes using a machine learning model for generating the predicted workload levels.

In some embodiments, the method further includes leveraging mixed-integer programming scaling optimization for predicting the trace-level performance of the application for different microservice replica scaling.

In some embodiments, the optimization method can include replica coordination constraints across microservices.

In some embodiments, the method further includes learning a pattern of cascading calls to predict workload levels across multiple traces.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIGS. 7A and 7B show a cart-add trace latency comparison between coordinated, uncoordinated and K8s utilization based horizontal pod auto-scaling (HPA);

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

As described in greater detail below, aspects of the present disclosure provide systems and methods that can provide a trace-driven call-graph-aware proactive coordinated autoscaling of component microservices in an application.

Although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may determine the number of replicas needed for a given microservice so that an application (that runs one or more of the microservices) can be executed within the one or more end-to-end transaction level service level objectives (SLOs) provided by a user. This may have the technical effect of allowing users to set SLOs at the "trace" level (for the overall application that uses one or more of microservice components) and use machine learning (ML) methods to determine resource allocation of all microservices to perform proactive coordinated autoscaling for meeting these SLOs, thus minimizing violations. Accordingly, the system and methods according to embodiments of the present disclosure provide a substantial improvement to technology and computer functionality.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Aspects of the present disclosure can provide systems and methods for users to set SLOs at the trace level while use machine learning (ML) methods determine resource allocation of all microservices to perform proactive coordinated autoscaling for meeting these SLOs, thus minimizing violations.

Figure 1:
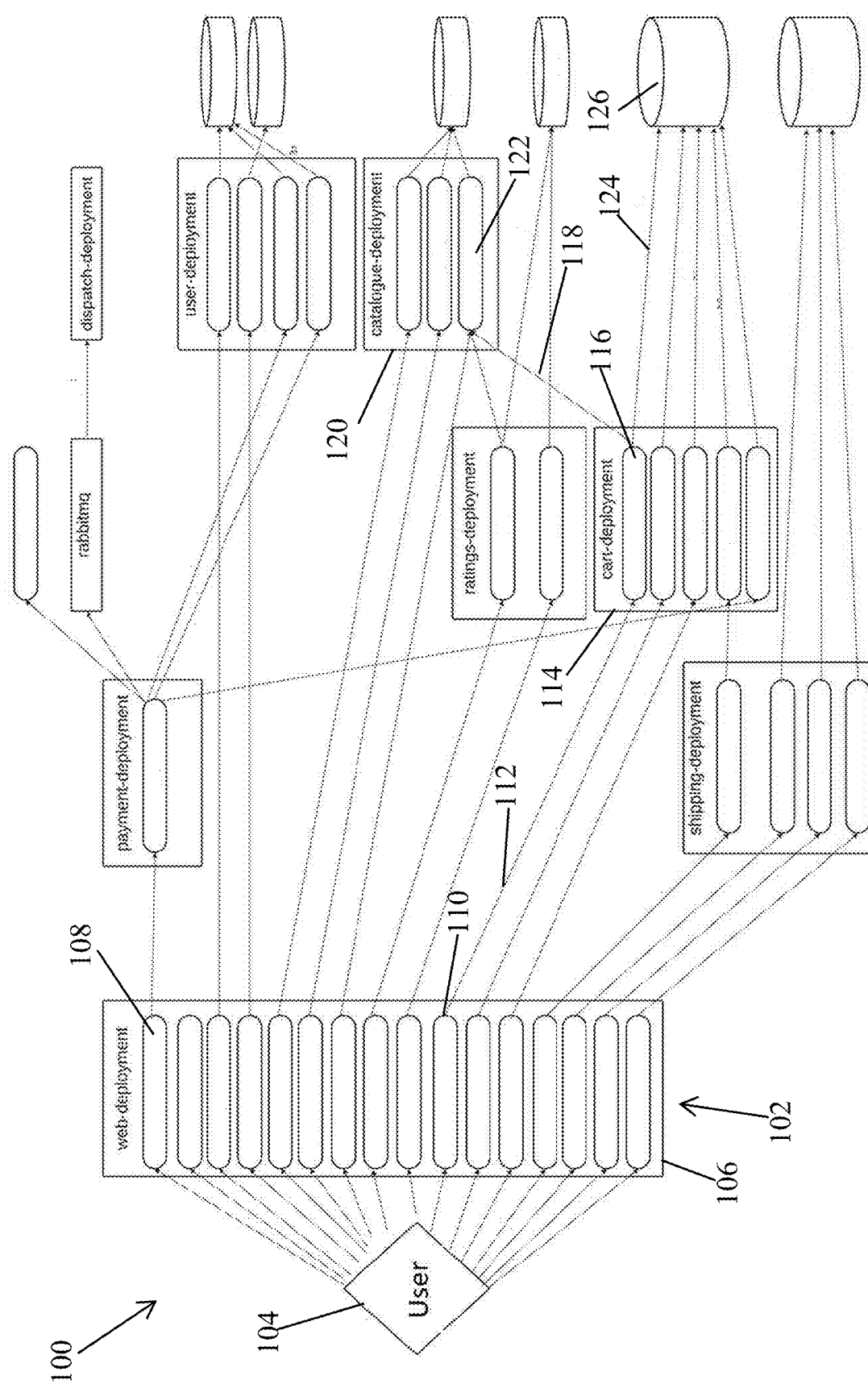
FIG. 1 shows a microservice architecture showing traces between endpoints of various services therein.

Referring to FIG. 1, a microservice architecture 100 is shown that includes a front end 102 that is accessible to a user 104. The front end 102 can be a front end service 106 that includes a plurality of front end endpoints 108. One such endpoint may be a cart_add endpoint 110, which generates an internal call 112 to the cart-deployment microservice component 114 and, namely, the add endpoint 116 of the cart-deployment microservice component 114. The add endpoint 116 may generate a first internal call 118 to the catalogue-deployment microservice component 120, namely, to the product endpoint 122 of the catalogue-deployment microservice component 120, and a second internal call 124 to a database 126. The entire end-to-end path, starting from the user call to endpoint 110, and the sequence on internal calls (112, 118, 124), together constitute a single trace.

The latency observed by the user, at the trace level, is an aggregate of the self-latencies of each of the end-points on a trace of the call graph for the cart_add endpoint 110 (in other words, the trace level latency may be an aggregation of the self-latencies of each of the individual endpoints of the services on the trace used in the application). On the contrary, a microservice latency is an aggregation of multiple call types going to different endpoints in the microservice, where individual endpoints can vary by orders of magnitude in self-latency. As described earlier, each trace chains together different endpoints in a microservice. Therefore, the cumulative latency of each endpoint, which is usually available via the application performance monitoring (APM) tools, can be influenced by calls to other downstream endpoints. Some APM tools may report self-latencies directly, else they can be estimated via disaggregation across end-points on the trace using the call graph.

Aspects of the present disclosure provide methods for resource allocation that can use ML methods to determine resource allocation of all microservices to perform proactive coordinated autoscaling for meeting one or more end-to-end user transaction SLOs. In general, the method of implementation can include offline steps, runtime observations and runtime inferences.

As discussed in greater detail below, the offline steps can include extracting a trace graph model for all API calls to the application. In other words, for each of the front end endpoints 108, the trace graph model can be determined. In the example trace described above, starting from the cart_add endpoint 110, the trace call graph model can include the call 112, the first call 118 and the second call 124. The offline steps can further include generating a performance-resource elasticity model for the microservice endpoints and generating a workload calls/second prediction model. The runtime observations can include the calls/sec to the frontend microservice endpoints 108 and the user SLO requirements. The runtime inferences can determine an endpoint level latency prediction and microservice horizontal pod auto-scaling decision leveraging the application trace call graphs.

Figure 2:
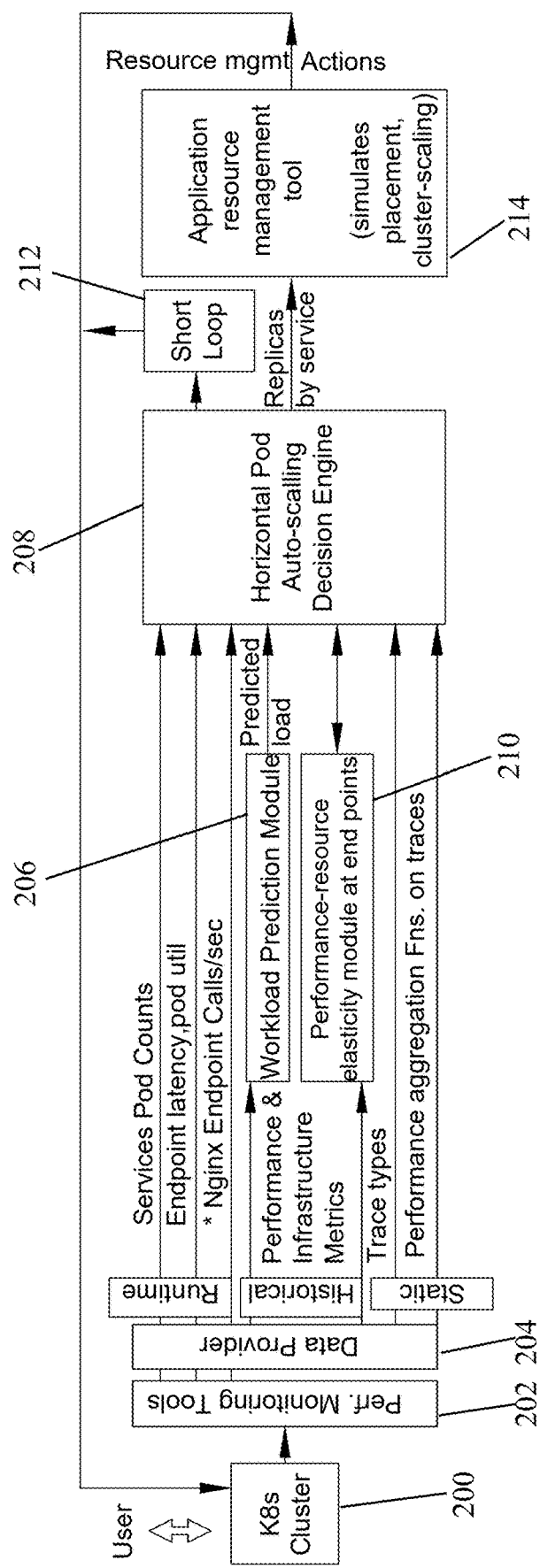
FIG. 2 shows a system block diagram for proactive coordinated horizontal auto-scaling of resources, consistent with an illustrative embodiment.

Referring to FIG. 2, an Kubernetes cluster 200 may receive input calls from the user. The Kubernetes cluster 200 may provide the front end 102 as described in FIG. 1, including front end services 106 and endpoints 108 for these services. An application monitoring and alerting tool 202, such as Instana along with infrastructure monitoring tools like Prometheus using cadvisor, may interface with the Kubernetes cluster 200. A data provider 204 may manage the data required for embodiments of the present disclosure. The data provider 204 provides certain predetermined data, including trace types, services list (along with those that are horizontally scalable or not), end point list (along with mapping to services), trace call graph of endpoints by trace type, historical data at end point level for the elasticity model described below, calls.per-second data, replicas of services data, self-latency of microservices, and cumulative latencies.

The data provider 204 can gather data during use of the system and process the data according to one or both of the vector endpoint (VE) method or the isolated endpoint (IE)

method. For the VE method, the data required to train this model needs to include all combined variations in the expected range for calls/sec and replicas for all endpoints of each microservice and their associated latency. In the example discussed above with reference to FIG. 1, the VE method would use the expected range for calls/sec for each of the five endpoints of the cart-deployment service 114. For the IE method, the data required to train this model needs to only include expected range for calls/sec and replicas for every isolated endpoint of each microservice (combinations of these variations are not necessary) and their associated latency. In the example discussed above with reference to FIG. 1, the IE method would need the latency values associated with the calls/sec for the add endpoint 116 of the cart-deployment service 114 with no calls to other endpoints of 114. The workload prediction module 206 can receive performance and infrastructure metrics and provide a predicted load to the HPA decision engine 208. The output of the workload prediction model 206 is workload prediction at the endpoint level for each component microservice. User calls to the front end generates trace-based calls to internal endpoints of microservices. Therefore, traffic observed at the front end is used to predict the expected calls to internal endpoints of microservices. Each frontend call could result in a multiplicative increase in calls or some probabilistic fraction of it at internal microservices. When multiple traces belong to a front end call, probabilistic trace level workload estimation can be done. Similarly, a front end call to one trace could predict an upcoming increase in calls to other traces, and therefore their endpoints, as part of expected user behavior. These patterns of cascading calls can be observed and learned by the workload prediction model 206 and used for pro-active coordinated autoscaling.

Figure 3:
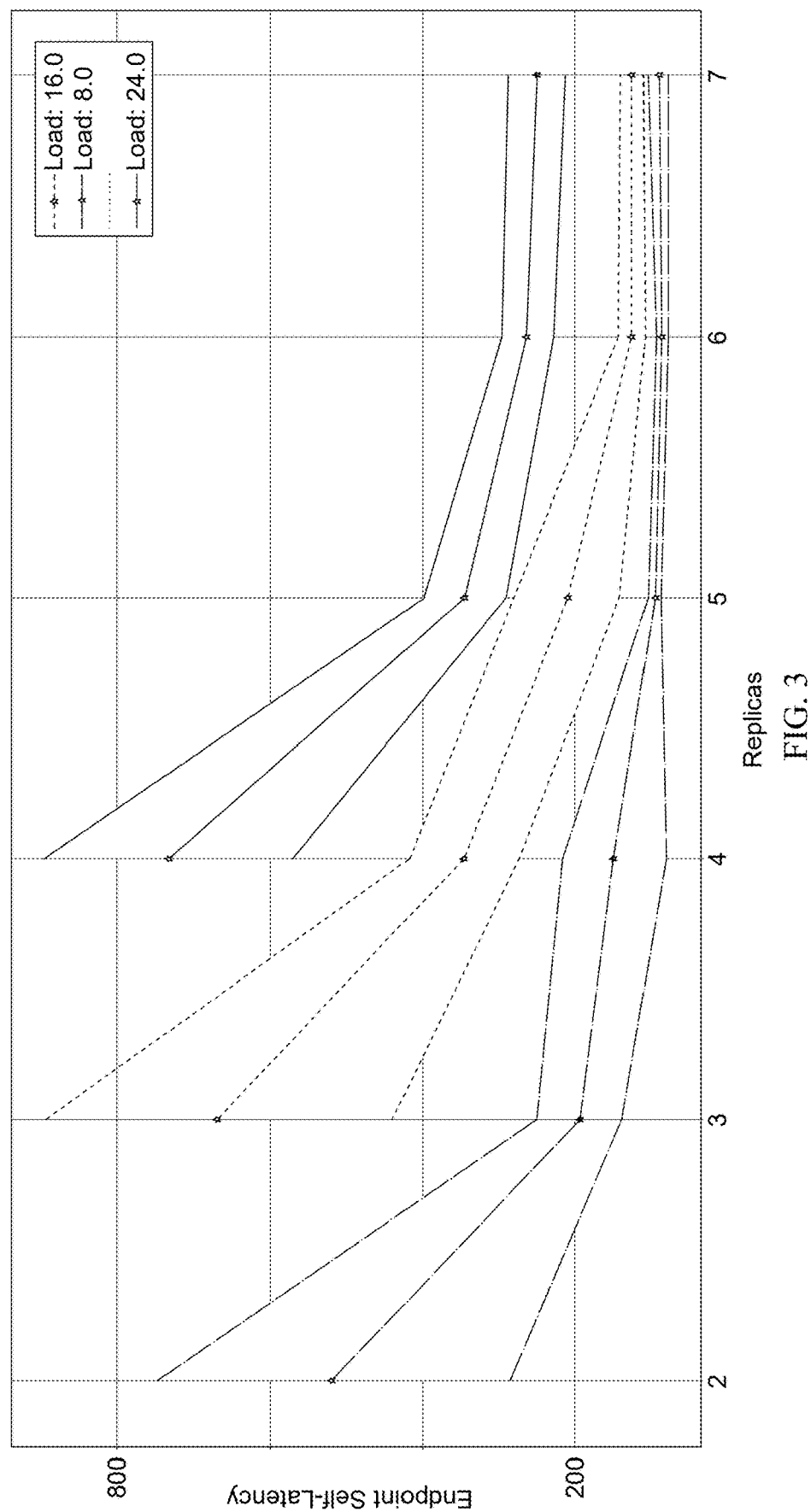
FIG. 3 shows a self-end point elasticity model, consistent with an illustrative embodiment.

Referring also to FIG. 3, the performance-resource elasticity module 210 can determine system elasticity. Elasticity is the change in performance (latency, throughput, resource utilization, or the like) with respect to unit change in resources. The performance-resource elasticity module 210 can predict performance with change in replicas and load at endpoint level. As discussed above, for the vector endpoint model, causal features are load vectors of all end points belonging to the service for each endpoint under consideration and the number of replicas of the end point. For the isolated endpoint model, causal features are load to the endpoint under consideration and the number of replicas of the microservice. The performance-resource elasticity module 210 can leverage supervised learning AI/ML methods in python, for example, to estimate these models.

FIG. 3 illustrates performance-resource elasticity data for loads of 8.0, loads of 16.0 and loads of 24.0. The graph shows the latency as compared to the number of replicas of a service for a given load. It should be understood that the latency values used herein are considered self-latency figures. In the example discussed above with respect to FIG. 1, the trace level latency would be for the entire cart_add endpoint 110 seen by the user, including latency in call 112, first call 118 and second call 124. The self-latency, however, refers to, for example, the latency of just the cart_add endpoint 116, independent of upstream call 112 and downstream calls 118 and 124.

Figure 4:
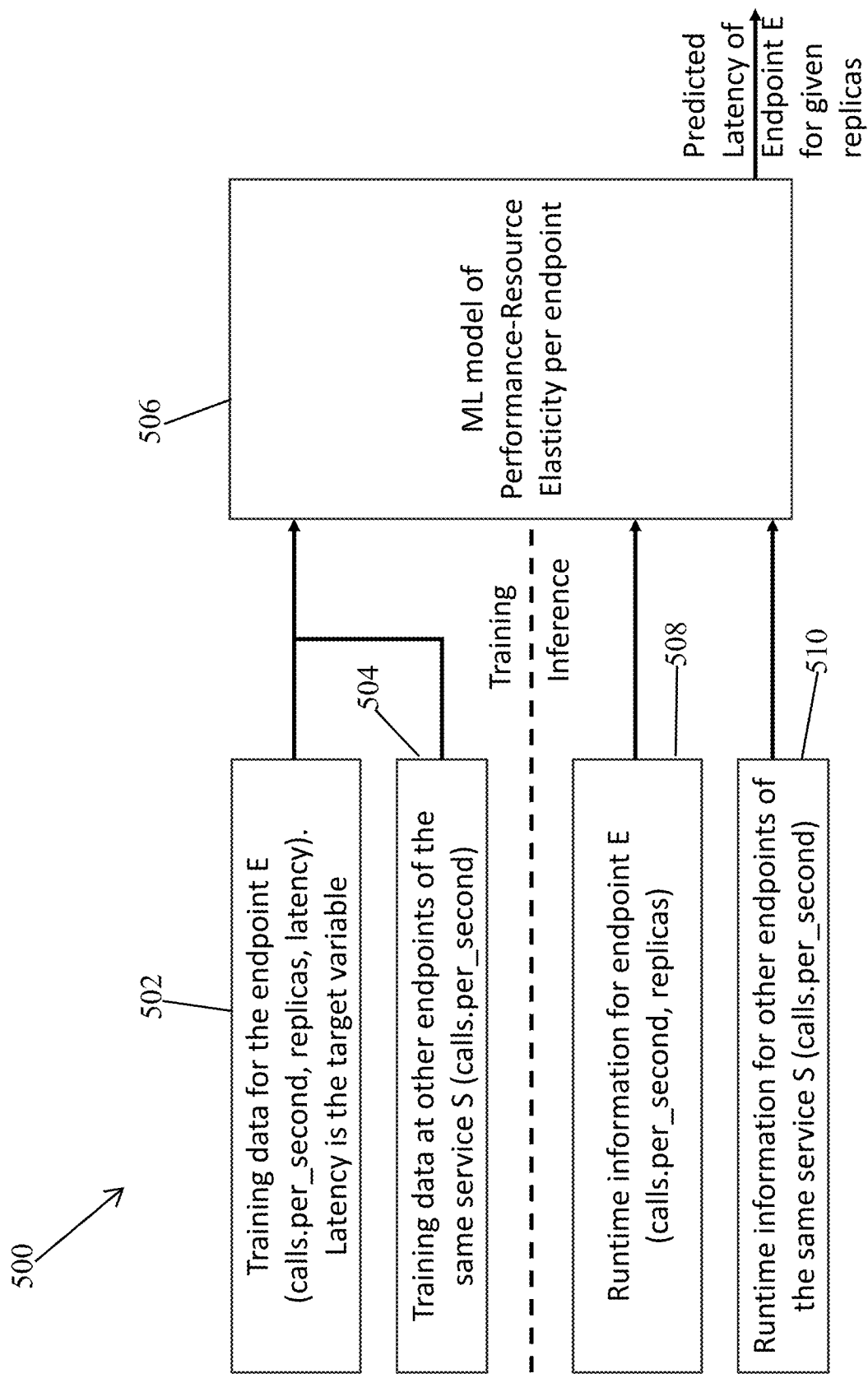
FIG. 4 shows a flow chart for latency prediction using a vector endpoint (VE) method at an endpoint E that belongs to service S.
Figure 5:
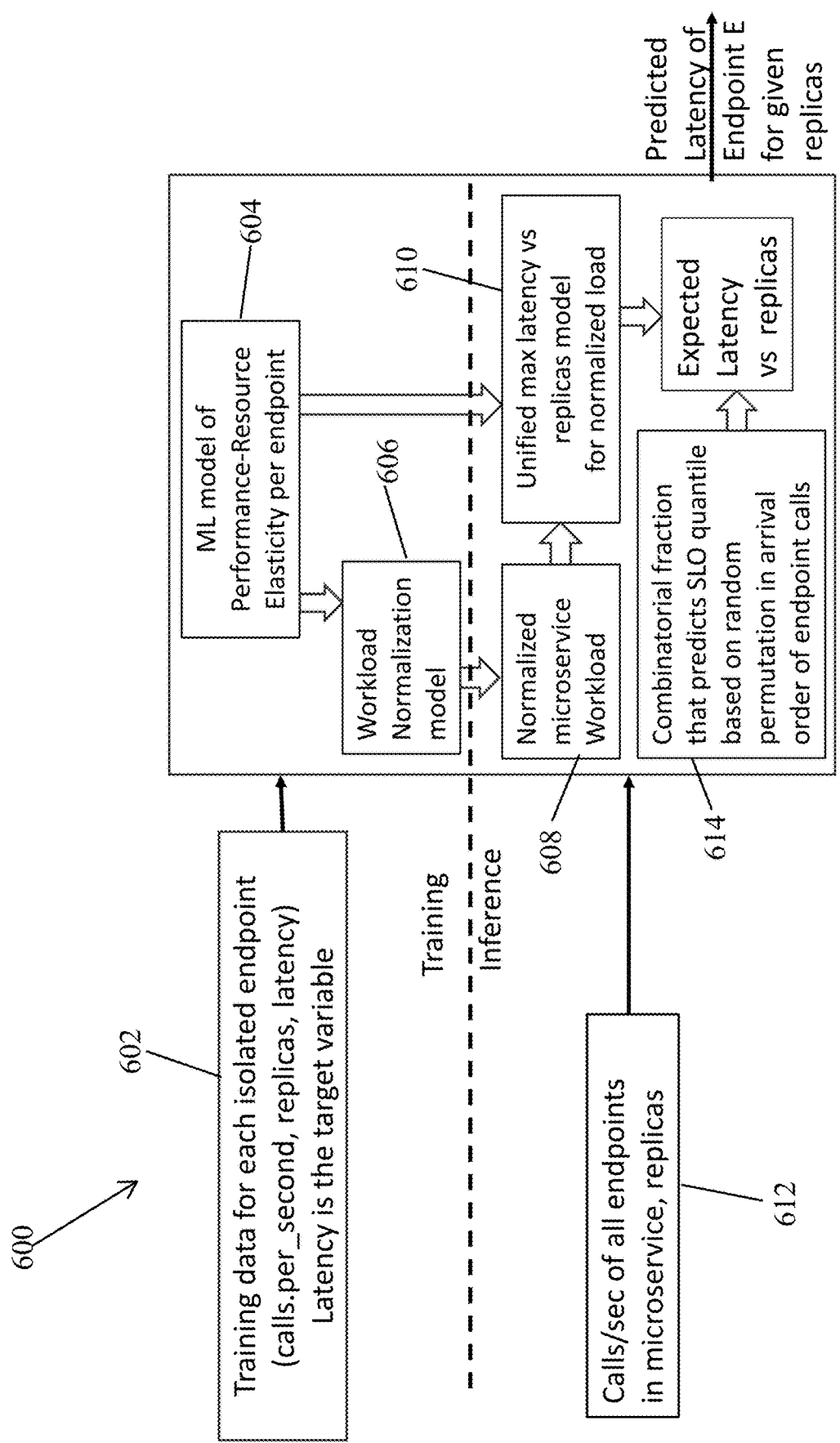
FIG. 5 shows a flow chart for latency prediction using an isolated endpoint (IE) method at an endpoint E that belongs to service S.

FIGS. 4 and 5 illustrate flow charts 500, 600 for latency prediction using the VE method and the IE method at an endpoint E that belongs to service S. For the VE method, in FIG. 4, during training, at block 502, training data for the endpoint E, (such as calls.per_second, replicas, latency) is provided. Here, latency is the target variable, but it should be understood that any performance metric may be used as the target variable. Further, at block 504, training data at other endpoints of the same service S (such as calls.per_second) is provided. This data can provide the ML model 506 of performance-resource elasticity per endpoint. During inference, at block 508, runtime information for endpoint E (such as calls.per_second and current number of replicas) is provided to the ML model 506. Further, at block 510, runtime information for other endpoints of the same service S (such as calls.per_second) is provided to the ML model 506. The ML model 506 can output the predicted latency of endpoint E for a given number of replicas of the service S.

For the IE method, in FIG. 5, at block 602, only the training data for each isolated endpoint (such as calls.per_second, replicas, latency) is required in training. In this case, however, the ML model 604 of performance-resource elasticity per endpoint may further utilize a workload normalization model 606 that can provide a normalized microservice workload at block 608 that can determine a unified maximum latency versus number of replicas model for the normalized load at block 610. During inference, at block 612, the calls/sec of all endpoints in a microservice and the current number of replicas can be provided, where a combinatorial fraction that predicts SLO quantile based on random permutation in arrival order of endpoint calls, at block 614, can be used to provide a predicted latency of endpoint E for a given number of replicas as the output.

An example of the IE method is as follows: For the training data, a microservice S has 2 endpoints: A, B, where fn represents any function. The data gathering step can include latency versus replica and load data, for each isolated endpoint, where Latency_A=fn (Replica_S, Load_A) and Latency_B=fn (Replica_S, Load_B). The workload normalization model can provide normalization based on linear scaling of the minimum unit of work (i.e., the minimum latency) for the service S, where Min_lat=min (Latency_A, Latency_B), Load Normalization factor for endpoint A=Norm_A=min (Latency_A)/Min_lat, and Load Normalization factor for endpoint B=Norm_B=min (Latency_B)/Min_lat. In this example, the normalized microservice workload can be determined, where Norm_calls_per_sec_A=Norm_A*Calls_per_sec_A, Norm_calls_per_sec_B=Norm_B*Calls_per_sec_B, and Norm_total_load_S=Norm_calls_per_sec_A+Norm_calls_per_sec_B. In this example, the unified latency versus replicas model for the normalized load can be determined, where Latency_S=fn (Replica_S, Norm_total_load_S), Predicted_max_latency_S max (Latency_S), and Predicted_max_latency_S is independent of the ordering of call arrivals to its endpoints. In this example, the expected percentile value of latency for individual endpoints can be determined, where for the 90th percentile given: Replica_S=1; Total_load_S=10; Calls_per_sec_A=1; Calls_per_sec_B=9; the probability of A being the last arriving call=possible combinations of arrival orders with A last/Total possible combinations of arrival orders=1/10=0.1. The probability of B being the last arriving call=possible combinations of arrival orders with B last/Total possible combinations of arrival orders=9/10=0.9. For the $90^{th}$ percentile of Latency_A implies that Arrival order has B last; Predicted_90pc_latency_A=Predicted_max_latency_S-min (Latency_B); and Predicted_90pc_latency_B=Predicted_max_latency_S.

The HPA decision engine 208 can have a goal is to optimize the resources provided, i.e. minimize total resources or penalize over/under utilization, subject to meeting all the trace level SLOs. Using elasticity models and proactive endpoint load prediction as inputs, the HPA decision engine 208 can find the coordinated scaling actions across services to meet trace level SLOs. Optimization is done at the level of overlapping traces and does not require a fully centralized solution. Mixed-integer programming (MIP) methods, as discussed below, can use self-latency from endpoint level elasticity models and endogenously perform latency aggregations on traces (which are essentially subtrees) and can leverage mathematical programming solvers, such as CPLEX. The HPA decision engine 208 can use methods to aggregate endpoint level latencies to trace level latencies based on the trace graph, can optimize for mean latencies exactly, and can use conservative approximations for quantile SLO targets where quantiles of individual endpoints are aggregated. The MIP module queries the latency inferencing model for the expected endpoint load level and retrieves the latency values corresponding to all replica values at a service.

The HPA decision engine 208 can use a short loop 212 to provide direct feedback to the Kubernetes cluster 200. In some embodiments, the replica recommendation may be delivered to an Application Resource Management tool a module 214 that can help ensure full stack cost/resource optimization, application performance, and continuous health while delivering the replica recommendation to the Kubernetes cluster 200.

The HPA decision engine 208 can use MIP methods to identify the optimal replicas of all microservices to meet trace-level SLO while maximizing resource utilization, given the performance elasticity model.

An application, as used herein, is described a acyclic directed graph G whose nodes represent (HTTP) endpoints. An edge $\in$ from endpoint $e_1$ to endpoint $e_2$ means that $e_1$ sends requests to $e_2$. Each endpoint e belongs to a service s, where a service can have multiple endpoints. The set of all services in the application is denoted as S. The set of endpoints belonging to service s is denoted as $E_s$. Typically, applications have (at least) one service that acts as the front end of the application, meaning that the endpoints of this service are called from external sources (i.e. users). For simplicity, it can be assumed in the following that there is only one frontend service f. Let $E_s$ be the set of endpoints of frontend service f. Per definition, each endpoint $e \in E_f$ has an indegree of 0. A trace t is defined as a sub-tree in G with two characteristics: (i) t's root is $e \in E_f$ and (ii) t includes all nodes in G reachable from e. The set of all traces in the application is denoted as T. It should be noted that a user query on a trace is like a business transaction and goes to every endpoint on this sub-tree. Also, it should be noted that traces can be interpreted as sub-trees because of acyclic character of G. However, G is not necessarily a tree itself, meaning that one node (endpoint) can be part of multiple traces.

One goal in horizontal auto-scaling is to decide the replicas $n_s$ for all services $s \in S$ in the application so that the latency of various traces are below the the user specified service-level objectives (SLOs) for each trace type, denoted by $SLO_t, \forall t \in T$ (or over a combination of traces).

Using historical data, the following functions can be trained for each service and end-point as appropriate. (1) Utilization of resource type r with respect to requested resource allocation to service s $$\in S: U_s^r(\lambda_s, n_s)$$

where $\lambda_s$ is the incoming arrivals rate or calls-per-second vector across all the endpoints $E_s$ within service s (i.e., $\lambda_s = \{\lambda_e | e \in E_s\}$) and $n_s$ is the number of replicas. (2) Throughput: $T_s(\lambda_s, n_s)$. This is the rate of output for the input load of $\lambda_s$ and replicas $n_s$. It should be noted that through this how many calls that are dropped is captured. Suppose working with one endpoint in a trace. Then for a given arrival rate $\lambda_s$, the throughput is $n_s \mu_s$ where $\mu_s$ is the service rate of s till the point the arrivals are $\lambda_s > n_s \mu_s$ and after that it is $\lambda_s$. In the former case, the latency will continue to increase exponentially and the queue will build up. So if it is assumed that the system is managing a stable queue, then $\lambda_s < n_s \mu_s$. This imposes a lower bound on $n_s$ which is referred to as $$n_s^{min}.$$

This statement also holds of the selected endpoint belongs to multiple traces. In this case, $\lambda_s$ is the sum of arrival rates over all incoming edges to this endpoint. (3) Latency: $L_e(\lambda_s, n_s)$ for $e \in E_s$: This is the the waiting time plus the service time for a service as a function of the arrivals and the replicas. This is called the local modeling as it is at each endpoint or the node of the trace and graph.

It can be assumed that for every trace, the rates of arriving user requests is going to be observed. Using this and the edges in G, the arrival to every endpoint can be gathered and this can be denoted by vector $\Lambda$ (i.e., $\Lambda = \{\lambda_e | e \in E_s, s \in S\}$). This is either predicted or observed at runtime, or both. It can be assumed that the throughput is really not going to change with the change in replicas. It should be noted that a lower bound can be put on the replicas to remain in the stable region. It can also be assumed that the latency numbers at end points are deterministic and point estimates that are aggregated over the trace.

As used herein T represented a set of trace types, S represents a set of services, E represents a set of endpoints, $E_s$ represents a set of endpoints in service s, $E_t$ represents a set of endpoints in trace t, $C_{et}$ represents children of an endpoint in a trace, $I_s$ represents a set of possible replicas of service s, $\Lambda$ represents arrival rate vector for all traces, $n_{si}$ represents a permitted number of replicas for service s, Lei represents self-latency of endpoint e with $n_{si}$ replicas of its corresponding service s given arrival vector $\Lambda$, $$U_{si}^r$$

represents utilization of resource r for service s with $n_{si}$ replicas and given arrival vector $\Lambda$, $$n_s^{min}$$

represents a minimum number of replicas to ensure the system is still in stable state, $o_t$ represents the root endpoint of trace t, $z_{si}$ represents binary variable that is 1 if the replicas is $n_{si}$ for service s, $n_s$ represents the number of replicas of service s, $L_e$ represents the self-latency of end-point e, $L'_e$ represents an auxiliary variable representing cumulative latency at endpoint e, and $w_t$ represents an auxiliary variable representing the slack in the latency for trace t.

The optimization model can be formulated with local performance models that require latency aggregation on a trace. Let $I_s$ be the set of possible replicas that service s can take on, possibly derived from the min and max values currently provided as an input. Let $z_{si}$ be a binary variable that is 1 if $n_{si}$ replicas are recommended for service s. Let $L_{ei}$, $$U_{si}^r$$

be the conditional values of the latency function $L_e(\lambda_s, n_{si})$ and utility function $$U_s^r$$

$(\lambda_s, n_{si})$ given $\lambda_s$ respectively. When trace type t is referred, (1) $e \in t$ is used to represent all endpoints in trace t; (2) o(t) is used to represent the root of the sub-tree and (3) $C_{et}$ is used to represent the set of children of endpoint e in trace t. The horizontal scaling problem can be formulated as an MIP as follows where:

$$P(\Lambda) = \min_{\substack{z_{si} \in \{0,1\} \\ n_s, L_s, l'_s, w_t \geq 0}} \sum_{r \in R} \sum_{s \in S} \left[ \alpha_r \left( \sum_{i \in I_s} U_{si}^r z_{si} - 1 \right)^+ + (1 - \alpha_r) \left( 1 - \sum_{i \in I_s} U_{si}^r z_{si} \right)^+ \right]$$

$$L'_{o(t)} + w_t = SLO_t, t \in T$$

$$L'_e \geq L_e + L'_{e'}, e' \in C_{et}, e \in t, t \in T$$

$$L_e = \sum_{i \in I_s} L_{ei} z_{si}\ e \in E_s, s \in S$$
$$s.t. e \in E_s$$

$$n_s = \sum_{i \in I_s} n_{si} z_{si}\ s \in S$$

$$n_s \geq n_s^{min}\ s \in S$$

$$\sum_{i \in I_s} z_{si} = 1\ s \in S$$

In this formulation, auxiliary variables L' are introduced for latency that captures the resultant (cumulative) latency for a sub-tree. Constraint aims to capture the recursive relationship between a parent and children in a sub-tree. Moreover, an objective is defined for optimizing for resource allocation by penalizing overage and underage against the requested resources, while ensuring the SLO by trace type is met. Alternatively, other objectives or a combination of them can be used, like the following (or the combination thereof): (1) Minimize the total resources consumed:

$$\min \sum_{s \in S} \sum_{r \in R} \sum_{i \in I_s} \alpha_s^r n_{si} z_{si}$$

where $$\alpha_s^r$$

is the requested amount of the resource r by service s and as a special case just the number of total pods (2) Maximize the slack in the SLO constraint: max $\Sigma_{t \in T} w_t$. With a small penalty for the slack variable $w_t$ in the objective, it can be ensured that L' can be interpreted as the cumulative latency. Without the penalty, L' will be free, if the SLO is not tight.

It should be noted that the above formulation allows for certain services that are not part of SLO equations, the utilization objective ensures that a desired utilization goal is instead met. This is in contrast to the case when resources (e.g., $\min_{z_{si}} \Sigma_{i \in I_s} n_{si} z_{si}$) are minimized, where in those services will get just the minimum number of resources.

It should be noted that latency is as a result of some resources being over-utilized. Latency can be modeled as a function of resource utilization (which is ratio of usage to capacity) instead of replicas. In this approach, the amount of usage also needs to be predicted with workload and the utilization is obtained using this usage and the number of replicas and then the mapping between latency and replicas can be leveraged in the optimization model.

Alternative approaches may be contemplated within the scope of the present invention. For example, alternative approaches can be used for prediction performance. It should be noted that instead of modeling performance as a function of load and replicas directly in one step, there can be alternative two-steps methods. For example, performance can be modeled as a function of resource headroom (capacity minus consumption) or utilization (consumption over capacity) and load resulting in change in resources consumed. Using the fact that the capacity is replicas * unit capacity, utilization and headroom can be estimated. This two-step approach also ultimately predicts performance with change in load and replicas. There can be other choices as well to leverage current utilization levels to model transients and/or alternatively combine both utilization/headroom and replicas Further, alternative approaches can be taken for decision optimization. The model could combine observed load and predicted load in various ways to query the performance model. For example, the model could use the higher of the two to be conservative. These models can be modified to explore actions using Thompson sampling (or other bandit or RL methods; e.g., one simple approach is to bootstrap historical data to generate predictions and respective optimal action; select any of these uniformly) to enhance the speed of the learning capability of the elasticity models. This can be used if the historical data does not have variations to build out a robust causal relationship. This approach can always be done in combination with a traditional approach, for example use the latter as a fallback mechanism when the data for inferencing is bad.

Results

Figure 6A:
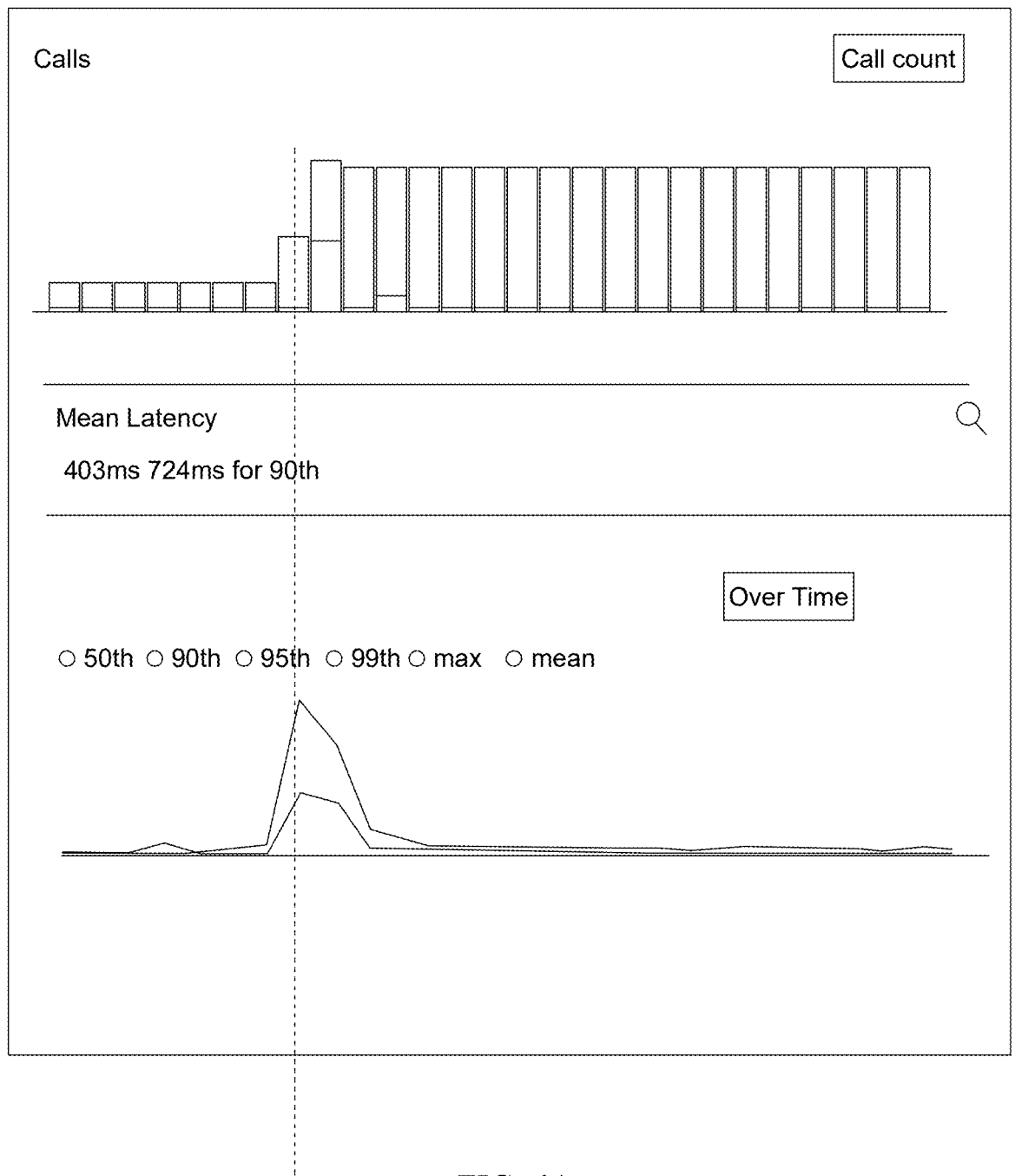
FIGS. 6A through 6C show results of step load increase on latency for conventional methods (FIGS. 6A and 6B) and methods consistent with an illustrative embodiment (FIG. 6C)
Figure 6B:
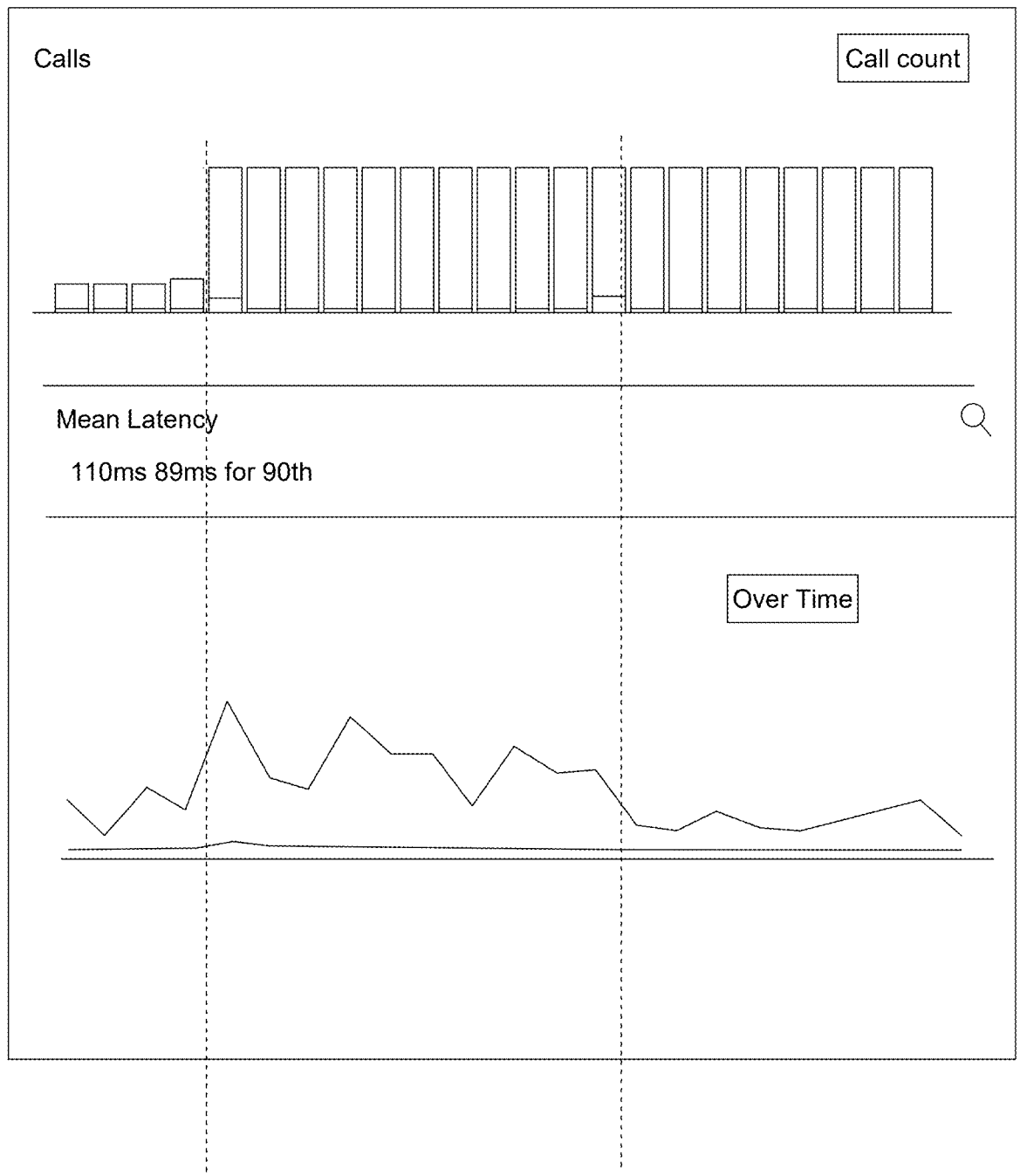
Figure 6C:
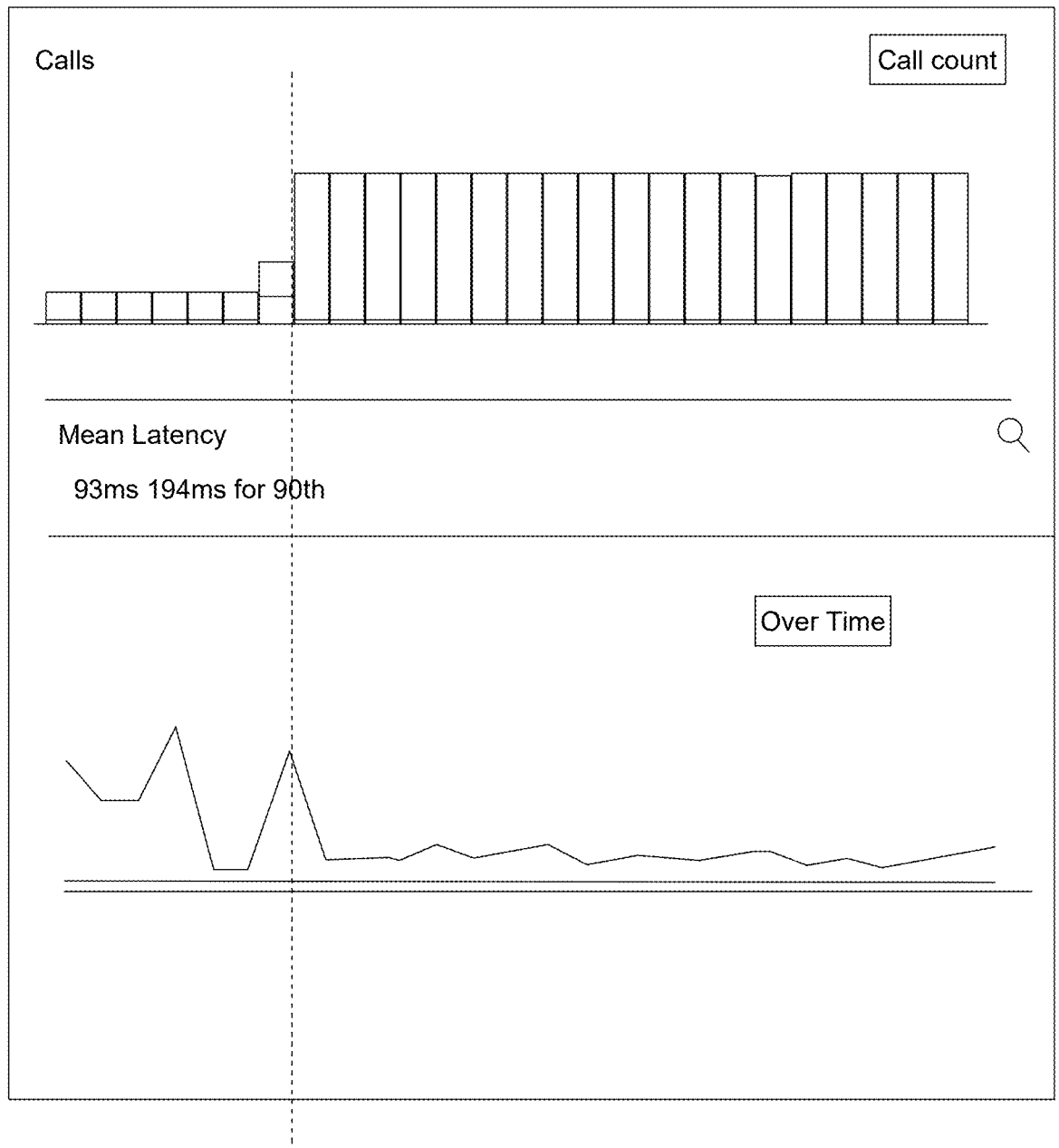

Referring to FIGS. 6A through 6C, it can be seen that the coordinated HPA (FIG. 6C), according to embodiments of the present disclosure, can provide direct latency control and fast latency correction as compared to Kubernetes resource scaling (FIG. 6A), which has the goal of 70% CPU utilization for each service, and as compared to uncoordinated HPA (FIG. 6B), which scales the upstream microservice replicas followed by the downstream microservice replicas.

Referring to FIGS. 7A and 7B, the cart-add endpoint trace latency is compared between coordinated HPA, according to embodiments of the present disclosure, uncoordinated HPA and Kubernetes' utilization-based HPA. As can be seen, the coordinated HPA provides the overall best results in terms of both mean latency of the trace (FIG. 7A) and the p90 latency of the trace (FIG. 7B).

Example Process

Figure 8:
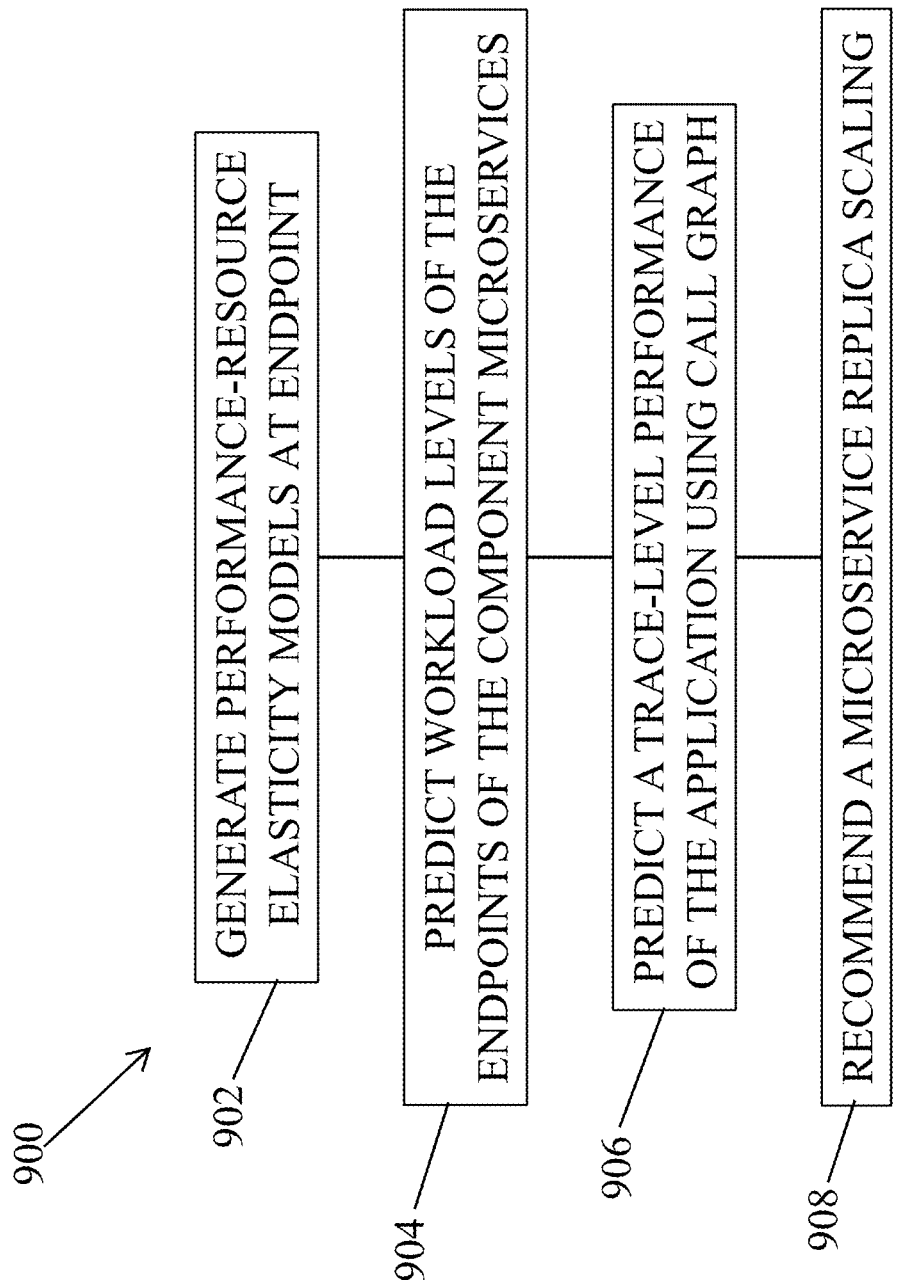
FIG. 8 shows a flow chart illustrating an overall process for trace-driven call-graph-aware proactive coordinated autoscaling of component microservices in an application, consistent with an illustrative embodiment.

It may be helpful now to consider a high-level discussion of an example process. To that end, FIG. 8 presents an illustrative process 900 related to the method for trace-driven call-graph-aware proactive coordinated autoscaling of component microservices in an application. Process 900 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 8, block 902 of process 900, can include an act of generating performance-resource elasticity models of the component microservices. The process 900 can further include, at block 904, an act of predicting workload levels of the endpoints of the component microservices. The process 900 can further include, at block 906, an act of prediction a trace-level performance of the component microservices. Finally, the process 900 can include, at block 908, at act of recommending a microservice replica scaling.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
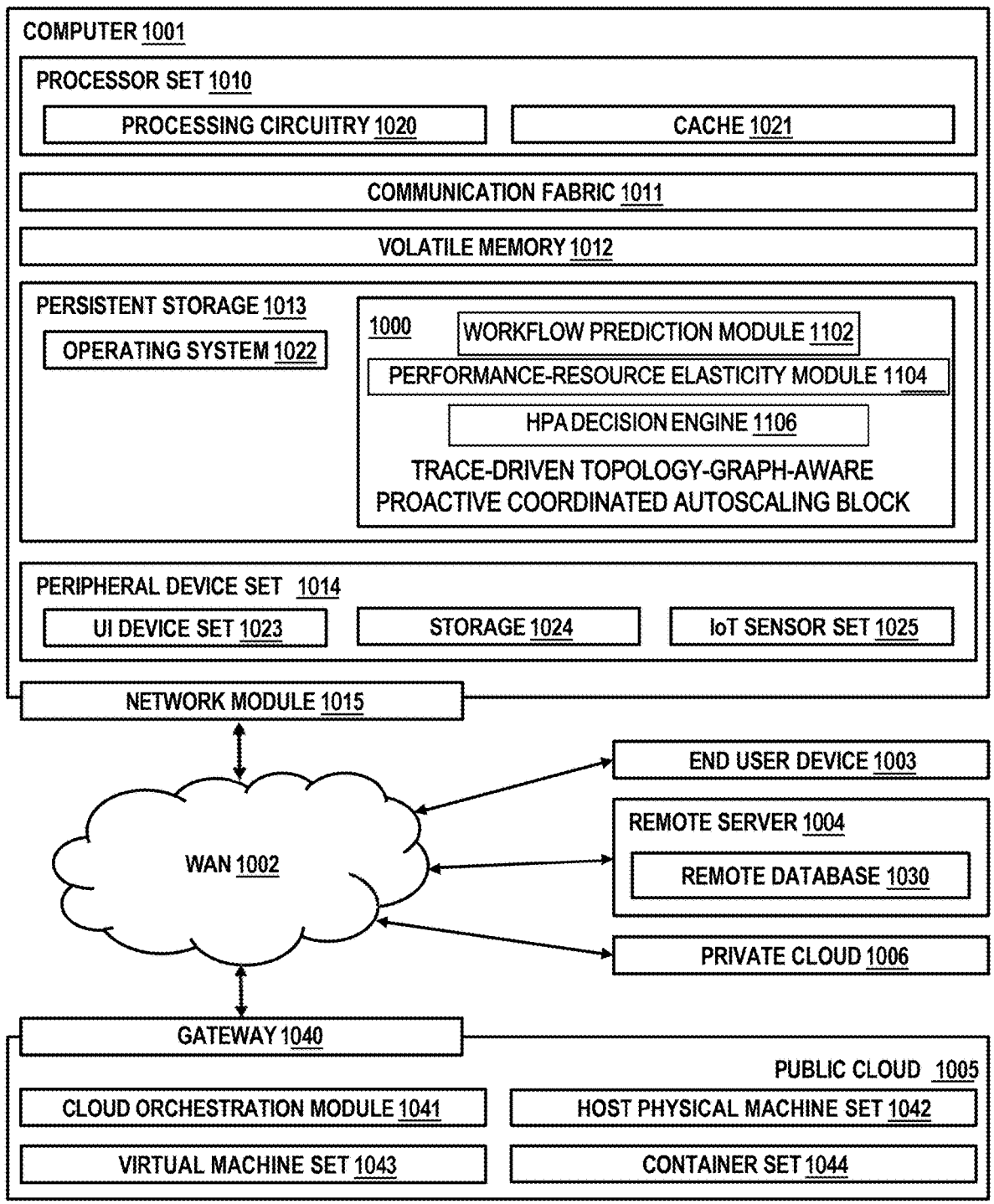
FIG. 9 is a functional block diagram illustration of a computer hardware platform that can be used to implement the method for trace-driven call-graph-aware proactive coordinated autoscaling of component microservices in an application, consistent with an illustrative embodiment.

Referring to FIG. 9, computing environment 900 includes an example of an environment for the execution of at least some of the computer code involved in performing the inventive methods, including trace-driven call-graph-aware proactive coordinated autoscaling block 1000, which can include a workload predication module block 1102, a performance-resource elasticity module block 1104 and a HPA decision engine block 1106. In addition to block 1000, computing environment 900 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1000, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 9. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 900, at least some of the instructions for performing the inventive methods may be stored in block 1000 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1000 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for trace-driven call-graph-aware proactive coordinated autoscaling of component microservices in an application, the method comprising:
    generating performance-resource elasticity models of endpoints of the component microservices of the application;
    predicting workload levels of the endpoint of the component microservices based on user traffic observed at a front end service;
    predicting a trace-level performance of the application for different microservice replica scaling based on the performance-resource elasticity models of the component microservice endpoints, the end points on a trace call graph and the predicted workload levels; and
    recommending a microservice replica scaling for each of the component microservices to meet predefined trace-level user service level objectives.

2. The computer-implemented method of claim 1, wherein the recommended microservice replica scaling is based on a microservice endpoint self-latency aggregation.

3. The computer-implemented method of claim 2, wherein the microservice endpoint self-latency is defined as an isolated latency contribution of a given endpoint of a given component microservice to an overall trace latency for each component microservice used in the application.

4. The computer-implemented method of claim 1, wherein the trace-level service level objectives include at least one of latency or throughput targets.

5. The computer-implemented method of claim 1, wherein the performance-resource elasticity models predict self-latency performance at each of the endpoints of a given component microservice as a function of a vector of workload levels to all endpoints that belong to the given microservice.

6. The computer-implemented method of claim 1, wherein the predicted trace-level performance is based on an aggregated self-latency of the component endpoints identified in a trace call graph.

7. The computer-implemented method of claim 1, further comprising using a machine learning model for generating the performance-resource elasticity models.

8. The computer-implemented method of claim 1, wherein the predicted workload levels are based on a predicted load, a currently observed load, or a combination thereof.

9. The computer-implemented method of claim 1, further comprising predicting workload levels at each endpoints of the component microservice used in the application.

10. The computer-implemented method of claim 1, further comprising using a machine learning model for generating the predicted workload levels.

11. The computer-implemented method of claim 1, further comprising leveraging mixed-integer programming scaling optimization for predicting the trace-level performance of the application for different microservice replica scaling.

12. The computer-implemented method of claim 1, further comprising learning a pattern of cascading calls to predict workload levels across multiple traces.

13. A system comprising:
a processor;
a memory coupled to the processor; and
a computer readable storage embodying a computer program code, the computer program code comprising instructions for trace-driven call-graph-aware proactive coordinated autoscaling of component microservices in an application, the instructions executable by the processor and configured to:
generate performance-resource elasticity models of endpoints of the component microservices of the application;
predict workload levels of the endpoints of the component microservices based on user traffic observed at a front end service;
predict a trace-level performance of the application for different microservice replica scaling based on the performance-resource elasticity models and the predicted workload levels; and
recommend a microservice replica scaling for each of the component microservices to meet predefined trace-level user service level objectives.

14. The system of claim 13, wherein:
the recommended microservice replica scaling is based on a microservice endpoint self-latency aggregation; and
the microservice endpoint self-latency is defined as an isolated latency contribution of a given endpoint of a given component microservice to an overall trace latency for each component microservice used in the application.

15. The system of claim 13, wherein the trace-level service level objectives include at least one of latency or throughput targets.

16. The system of claim 13, wherein:
the performance-resource elasticity models predict self-latency performance at each of the endpoints of any given component microservice as a function of a vector of workload levels to all endpoints that belong to the given microservice; and
the predicted trace-level performance is based on an aggregated self-latency of the component microservices identified in a trace graph.

17. The system of claim 13, wherein the instructions are further configured to:
use a machine learning model for generating the performance-resource elasticity models; and
use a machine learning model for generating the predicted workload levels.

18. The system of claim 13, wherein the instructions are further configured to predict workload levels at each endpoints of the component microservice used in the application, wherein the predicted workload levels are based on a predicted load, a currently observed load, or a combination thereof.

19. A computer program product for trace-driven call-graph-aware proactive coordinated autoscaling of component microservices in an application, the computer program product comprising a computer readable storage medium having program instructions embodied therewith, the program instructions executable by a computer to cause the computer to:
generate performance-resource elasticity models of endpoints of the component microservices of the application;
predict workload levels of the endpoint of the component microservices based on user traffic observed at a front end service;
predict a trace-level performance of the application for different microservice replica scaling based on the performance-resource elasticity models and the predicted workload levels; and
recommend a microservice replica scaling for each of the component microservices to meet predefined trace-level user service level objectives.

20. The computer program product of claim 19, wherein:
the recommended microservice replica scaling is based on a microservice endpoint self-latency aggregation; and
the microservice endpoint self-latency is defined as an isolated latency contribution of a given endpoint of a given component microservice to an overall trace latency for each component microservice used in the application.

* * * * *